March 27, 1951 A. F. J. LAFKY 2,546,604
TRAIL CART
Filed May 13, 1948 2 Sheets-Sheet 1
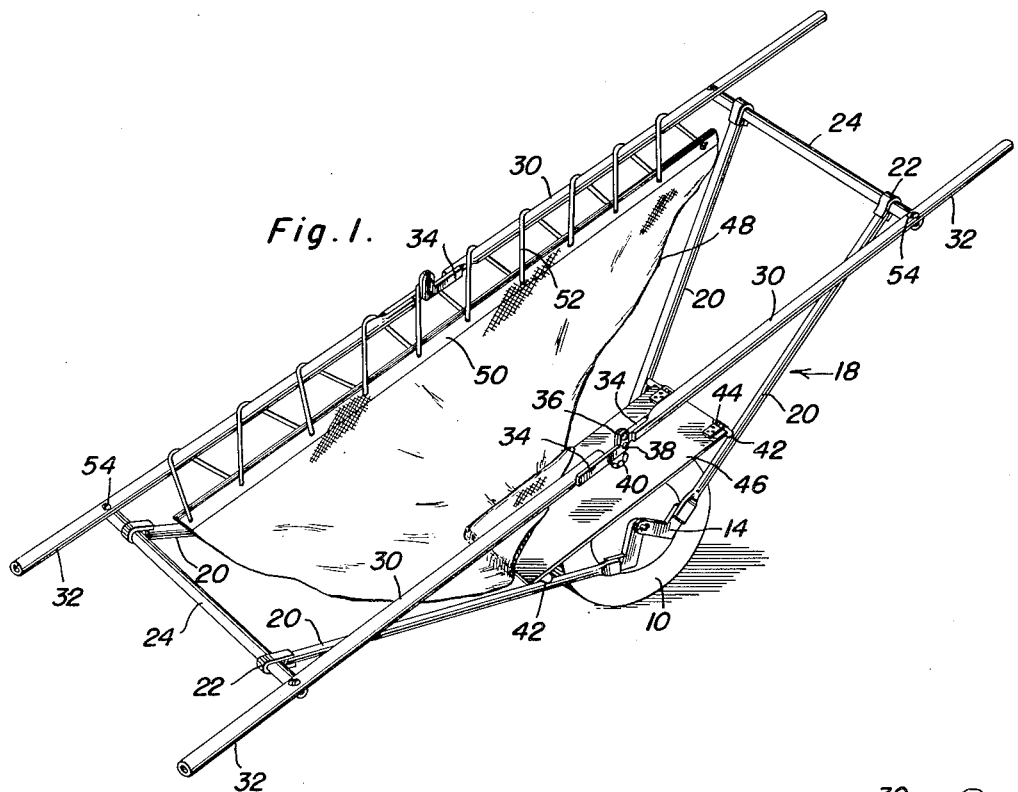
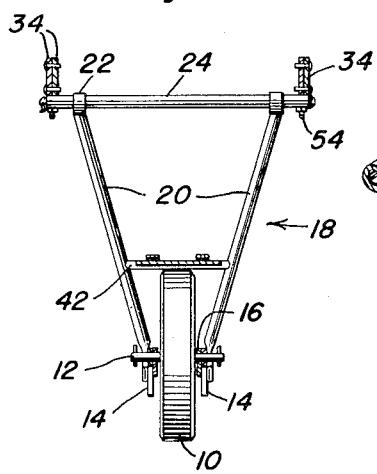
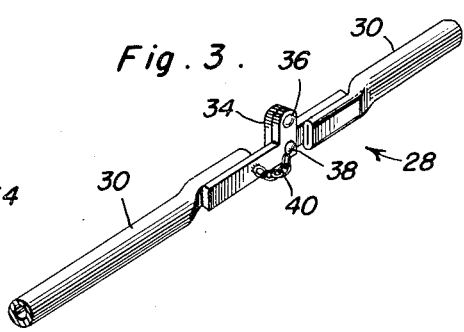
Inventor
Albert F. J. Lafky
By *Clarence A. O'Brien
and Harvey B. Jacobson*
Attorneys March 27, 1951  A. F. J. LAFKY  2,546,604
TRAIL CART
Filed May 13, 1948  2 Sheets-Sheet 2
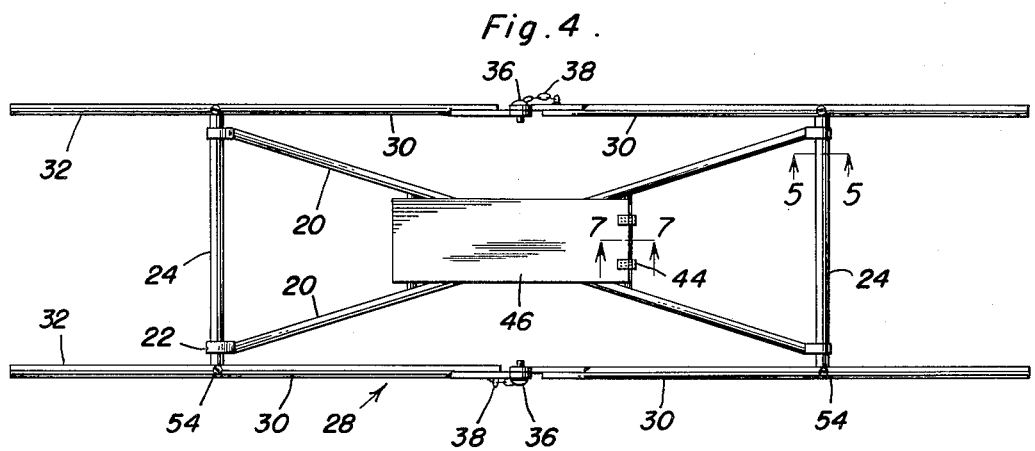
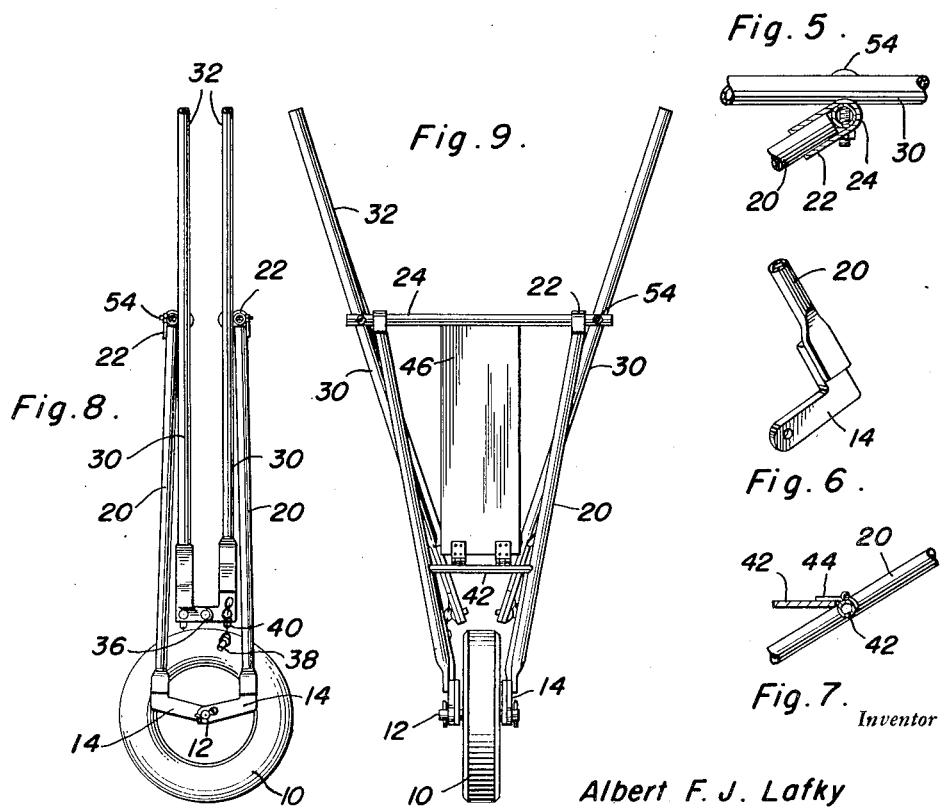
Inventor
Albert F. J. Lafky Patented Mar. 27, 1951

2,546,604

UNITED STATES PATENT OFFICE 2,546,604

TRAIL CART

Albert F. J. Lafky, Longview, Wash.

Application May 13, 1948, Serial No. 26,821

6 Claims. (Cl. 296—20)

This invention relates generally to wheeled article supports, and more particularly to a single wheeled collapsible cart designed particularly for use on narrow trails and designed also for alternative use as a litter.

A primary object of this invention is to provide a one wheeled cart which can be used by sportsmen and others to carry equipment along narrow trails without undue interference with brush and the like at the sides of the trail.

Another object of this invention is to provide a one wheeled cart which is collapsible into a small compass, and which can be constructed to carry a large quantity of material without being in itself of great weight.

Another object of this invention is to combine with a device of this character employing a flexible apron of sheet material, means to support a lower central portion of this apron when fully loaded, whereby the security of the material carried and the useful life of the apron per se are increased.

Still another object of this invention, ancillary to the preceding objects is to provide means for preventing interference of the load carried with the ground-contacting wheel.

And a last object to be mentioned specifically is to provide a cart of the character mentioned above which is relatively inexpensive and practicable to manufacture, which is safe, simple and completely convenient to operate, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a three dimensional view of the assembled cart, a portion of the apron being broken away in order to facilitate illustration of the parts therebeneath when the apron is in operative position;

Figure 2 is a vertical transverse sectional view, taken substantially upon a vertical center line of the device;

Figure 3 is an enlarged fragmentary detailed view showing how the sections of the bars at the top of the cart are connected together;

Figure 4 is a top plan view of the assembled device, with the apron removed;

Figure 5 is an enlarged fragmentary view designed to illustrate how the sections of the said arms are connected to the parts hereinafter referred to as the transverse members;

Figure 6 is an enlarged fragmentary view of the lower end of one of the arms of a leg with its angle terminal;

Figure 7 is an enlarged fragmentary sectional view of one end of a platform used to support a lower central portion of said apron, and this figure shows how this platform is hinged to a brace carried by a pair of said arms;

Figure 8 is a side elevational view of this cart in collapsed position, with the apron removed; and, Figure 9 is a similar view of the collapsed cart, the view being taken as from one end of the collapsed cart, this view being designed primarily to indicate the positioning of said platform within the collapsed cart and to indicate how the articulated arms are pivoted inwardly at the bottom, facilitating the movement of the cart along a trail when the same is in collapsed position.

Similar characters of reference designate similar or identical elements and portions throughout the specification and throughout the several views in the drawings.

Referring now to the drawings in detail, this invention includes a wheel 10 which will ordinarily be pneumatic tired and which will have an axle 12. Angle terminals 14 are mounted upon the ends of this axle 12 and friction washers 16 are used to space the terminals 14 from the hub portion of the wheel, the angle terminals being used to connect legs, generally indicated by the numeral 18, to the axle. Each leg is comprised of a pair of divergent arms 20, rigidly secured to the terminals 14 at one end and having arcuate strap bearings 22 on the other end, whereby pivotal connection is effected between the arms 20 and a transverse member 24 associated with each of the legs 18.

The transverse members are illustrated as hollow tubes of a length considerably in excess of the length of the axle 12, and these transverse members are pivoted on a pair of articulated bars, generally indicated by the numeral 28. Each bar 28 comprises a pair of substantially similar sections 30, the outer ends 32 thereof functioning as handles, and the inner ends have angle terminals 34 rigidly secured thereto and apertured to receive a pivot pin or bolt 36. Each angle terminal 34 is further apertured to receive a removable pin 38 when the arms 30 are colinear, that is, when the last mentioned apertures are in registration. The removable pins 38 are connected by means of chains 40 to one of the sections 30, to prevent the loss of these removable pins.

A rigid transverse brace 42 is rigidly and terminally secured to corresponding portions of each pair of arms 20 at points intermediate the ends of the latter. One of the braces 42 functions as a pivot bar for hinges 44 on one end of a platform 46. This platform 46 may be of rectangular shape and of a length and width allowing the same to assume a horizontal position, that is, parallel to the bars 28 when the sections thereof are colinear, while the other of said braces functions as a support for the other end of the platform 46, all as will be clearly understood from a consideration of Figures 1 and 4.

An apron comprised of a sheet of flexible material 48 with a seamed edge portion 50 is hung by means of cords or cables 52 on the bars 28, as indicated in Figure 1. The cords 52 are looped over the bars 28 and through eyelets in the seamed edge portion 50. The form of the apron may vary according to individual preferment, but it is an important feature of this invention that the central lower portion of this apron will be supported upon the platform 46 during the operation of this device.

A pivotal connection of the sections 30 of the arms 28 is best illustrated in Figure 5, and may comprise simply bolts 54 inserted through the sections 30 and through the transverse members 24.

The operation of this invention will be clearly understood from the foregoing description of the mechanical details thereof, taken in connection with the above recited objects and the drawings. In recapitulation, it might be noted that the bars 28 may be collapsed inwardly at their lower ends, as indicated in Figure 9, when the removable pin 38 has been removed and both the legs and the arms have been collapsed inwardly so that the bolts 54 on each side of the device are colinear, allowing both sections 30 to pivot about a common axis. It may also be mentioned that in the collapsed position of the device, the platform 46 will be disposed as indicated in Figure 9, the upper end of the platform being held between the transverse members 24.

Obviously many minor variations may be made in the exact constructional detail and proportionment of the various elements of this invention without departure from the spirit of this invention, and the scope of this invention should be limited only as determined by a proper interpretation of the sub-joined claims.

Having described the invention, what is claimed as new is:

1. A collapsible trail cart comprising a ground contacting wheel having an axle extending on each side thereof, a pair of legs pivoted on each end of the axle so as to be alternatively upwardly divergent in operative position and parallel in collapsed position, transverse members on the ends of the legs remote from said axle, side bars having hinge joints at the center and carried by said transverse members, and means to retain the articulated parts of each side bar in colinear relation, the hinge joints approaching the axle when the cart is collapsed and the legs and side bars being proportioned so that the wheel is exposed and the cart is in the general form of a wheelbarrow when collapsed.

2. A collapsible trail cart comprising a ground contacting wheel having an axle extending on each side thereof, a pair of legs pivoted on each end of the axle so as to be alternatively upwardly divergent in operative position and parallel in collapsed position, transverse members on the ends of the legs remote from said axle, side bars having hinge joints at the center and carried by said transverse members, and means to retain the articulated parts of each side bar in colinear relation, said side bars having hinges at their central points allowing the hinged portions to collapse downwardly from operative positions to positions adjacent the ends of said axle, the hinge joints approaching the axle when the cart is collapsed and the legs and side bars being proportioned so that the wheel is exposed and the cart is in the general form of a wheelbarrow when collapsed.

3. A collapsible trail cart comprising a ground contacting wheel having an axle extending on each side thereof, a pair of legs pivoted on each end of the axle so as to be alternatively upwardly divergent in operative position and parallel in collapsed position, transverse members on the ends of the legs remote from said axle, articulated side bars carried by said transverse members, means to retain the articulated parts of each side bar in colinear relation, said side bars having hinges at their central points allowing the hinged portions to collapse downwardly from operative positions to positions adjacent the ends of said axle, and said side bars being pivoted on said transverse bars allowing said hinged portions to collapse toward each other simultaneously with said downward collapse.

4. A collapsible trail cart comprising a ground contacting wheel having an axle extending on each side thereof, a pair of legs pivoted on each end of the axle so as to be alternatively upwardly divergent in operative position and parallel in collapsed position, transverse members on the ends of the legs remote from said axle, articulated side bars carried by said transverse members, and means to retain the articulated parts of each side bar in colinear relation, said transverse members being pivoted on said legs, and said bars being pivoted on said transverse members so that central portions of said bars are collapsible both downwardly and toward each other.

5. A collapsible trail cart comprising a ground contacting wheel having an axle extending on each side thereof, a pair of legs pivoted on each end of the axle so as to be alternatively upwardly divergent in operative position and parallel in collapsed position, transverse members on the ends of the legs remote from said axle, articulated side bars carried by said transverse members, means to retain the articulated parts of each side bar in colinear relation, a table hinged at one end to one of said legs between said axle and the corresponding transverse member, means on the other leg to support the outer end of said table in horizontal position when the cart is in use, and an apron of flexible sheet material marginally secured to said bars and depending onto said table.

6. A cart according to claim 5 and wherein said legs are each comprised of divergent arms, and said means is a rigid transverse brace joining the arms at points intermediate the ends thereof.

ALBERT F. J. LAFKY.

REFERENCES CITED

The following references are of record in the file of this patent:

UNITED STATES PATENTS

| Number | Name | Date |
| --- | --- | --- |
| 547,288 | Remington | Oct. 1, 1895 |
| 1,483,607 | Liedtke | Feb. 12, 1924 |
| 2,429,028 | Neeley | Oct. 14, 1947 |
| 2,464,525 | Nurney | Mar. 15, 1949 |
| 2,465,112 | Murphey | Mar. 22, 1949 |